Nov. 18, 1947.    B. GOLDBERG ET AL    2,430,870
METHOD AND APPARATUS FOR TESTING THE CURVATURE OF REFLECTOR MOLDS
Filed Sept. 4, 1944    4 Sheets-Sheet 1
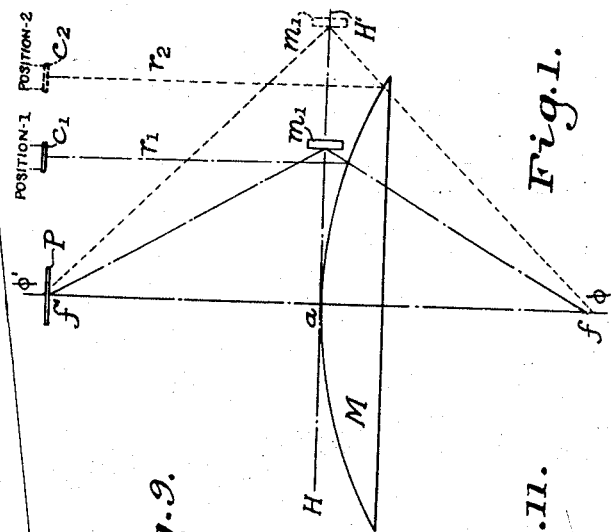
Fig. 1.
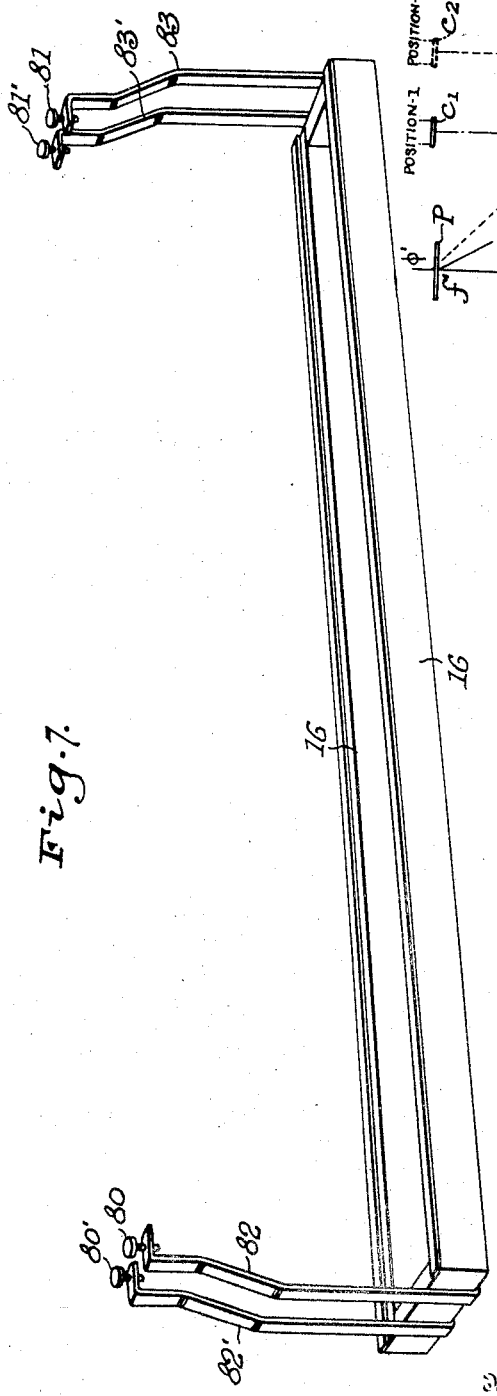
Fig. 7.
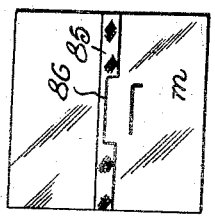
Fig. 9.
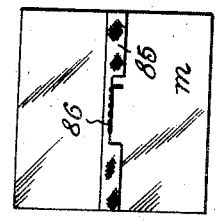
Fig. 11.
Fig. 8.
Fig. 10.
Inventors
Benjamin Goldberg
Nels C. Benson
By
Attorneys

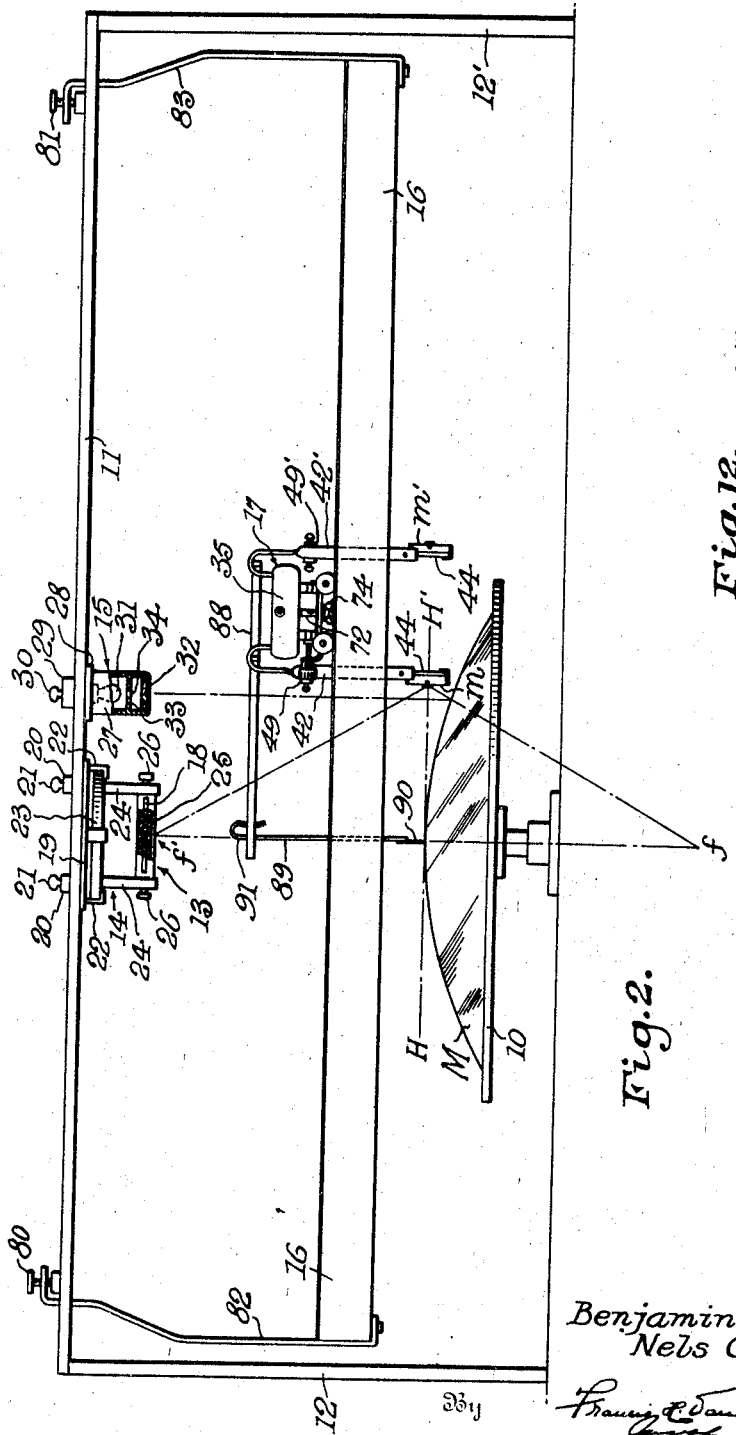
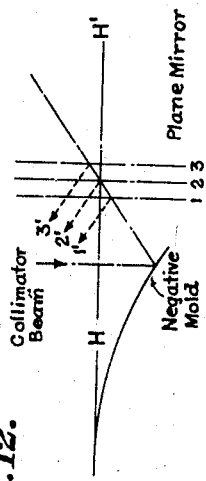

Nov. 18, 1947. B. GOLDBERG ET AL 2,430,870
METHOD AND APPARATUS FOR TESTING THE CURVATURE OF REFLECTOR MOLDS
Filed Sept. 4, 1944 4 Sheets-Sheet 3
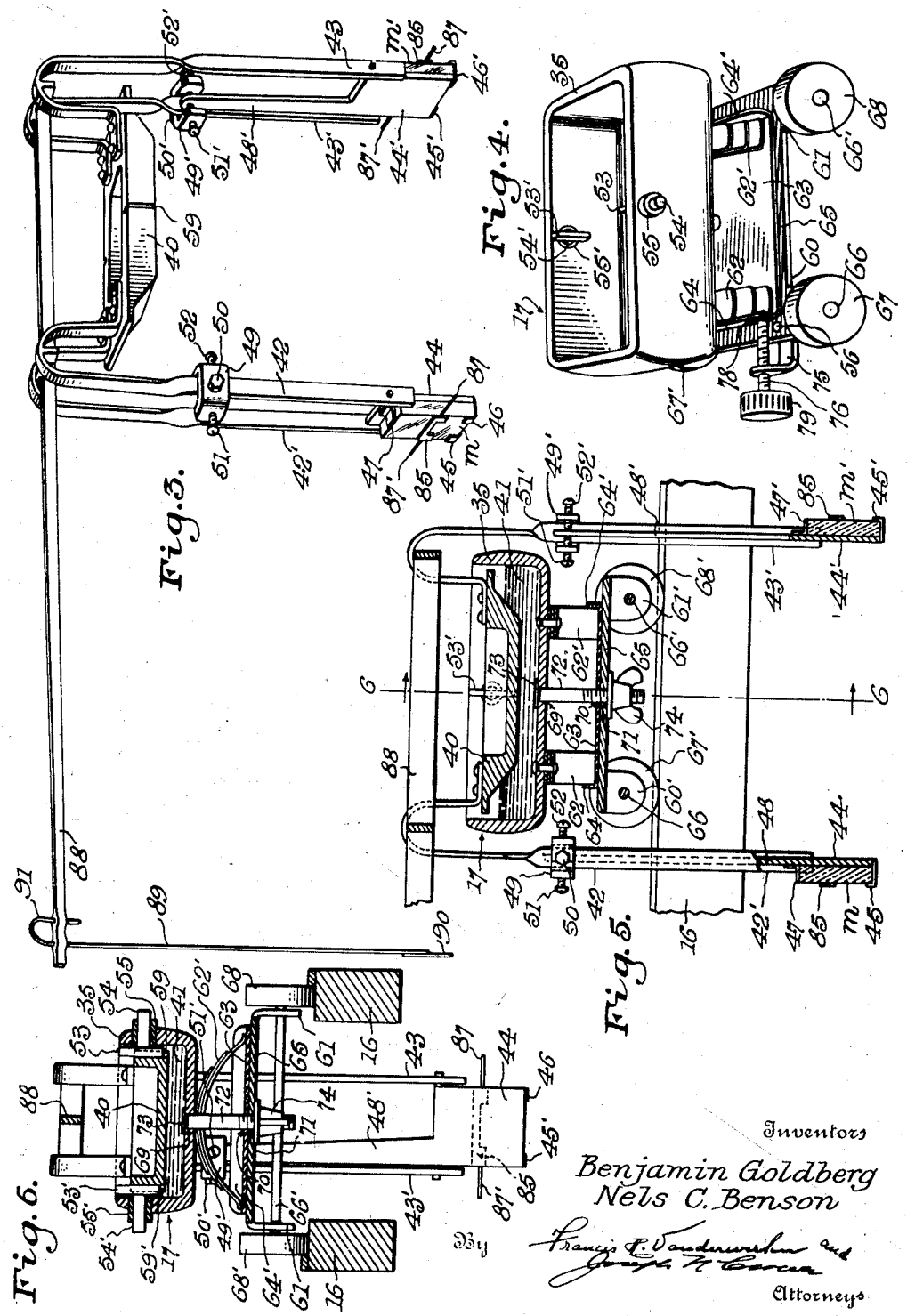
Inventors
Benjamin Goldberg
Nels C. Benson
Attorneys Nov. 18, 1947.                  B. GOLDBERG ET AL                    2,430,870
         METHOD AND APPARATUS FOR TESTING THE CURVATURE OF REFLECTOR MOLDS
                         Filed Sept. 4, 1944              4 Sheets-Sheet 4

Inventors
Benjamin Goldberg
Nels C. Benson
By
Attorneys

Patented Nov. 18, 1947

2,430,870

UNITED STATES PATENT OFFICE 2,430,870

METHOD AND APPARATUS FOR TESTING THE CURVATURE OF REFLECTOR MOLDS

Benjamin Goldberg and Nels C. Benson, Washington, D. C.

Application September 4, 1944, Serial No. 552,662

10 Claims. (Cl. 88—14)

(Granted under the act of March 3, 1883, as amended April 30, 1928; 370 O. G. 757)

The invention described herein may be manufactured and used by or for the Government for governmental purposes, without payment to us of any royalty thereon.

This invention relates generally to a method and apparatus for testing the curvature of convex surfaces but more particularly to a method and means for determining the curvature of molds used in the production of concave mirrors to locate areas in the surfaces of said molds which would cause spherical aberration in the mirrors produced thereby.

One object of the invention is to provide a simple and accurate method and means for producing reflectors or lenses free of spherical aberration by perfecting the curvature of the molds from which they are formed.

Another object of the invention is to provide an apparatus which effects a visual representation of the spherical aberration inherent in a negative mold—thus permitting a better control of the aberration in the reflectors produced from said mold.

Another object of the invention is to eliminate the necessity of producing mirrors from a negative mold to determine their focal characteristics.

Still another object of the invention is to provide a simple and accurate method for obtaining a focal point test for the convex surface of a paraboloid of revolution or negative mold, used in the production of parabolic mirrors.

A further object of the invention is to provide a check on change of aberration produced in a negative mold throughout its life to provide a precise aberration control in the production of mirrors.

Referring to the drawings, in which like parts are indicated by similar reference characters:

Fig. 1 is a diagrammatic view showing the paths of rays from the collimator to the photographic plate.

Fig. 2 is an assembly view showing in elevation a mirror mold and the testing apparatus in operative position.

Fig. 3 is a perspective view showing the raft and mirror supports, and

Fig. 4 is a perspective view showing the raft car, including the container and running gear.

Fig. 5 is a sectionized view of the raft car, container, and floating raft with mirrors attached, taken on a vertical mid-section.

Fig. 6 is a sectionized view taken on the line 6—6 of Fig. 5.

Fig. 7 is a perspective view of the track, and track supports.

Fig. 8 shows a mirror having a horizontally located cloth strip cut away centrally to its longitudinal center line with the light beam below the center line of said strip.

Fig. 9 shows a similar view to Fig. 8, with the light beam image below and grazing the cloth at its center line.

Fig. 10 is a similar view to that shown in Fig. 8, with the image projecting partially over the edge of the cloth.

Fig. 11 shows the mirror and strip in a view similar to Fig. 9 but with laterally projecting centering wires, and the image grazing said cloth and in alignment with said wires.

Fig. 12 is a diagram showing reflected rays for various positions of the mirror along the tangent H—H'.

Figure 13:
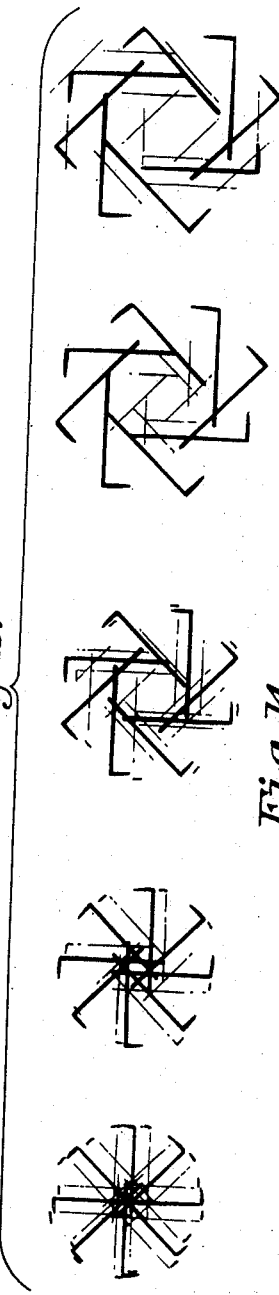
Fig. 13 shows the aberration characteristics of a parabolic glass form throughout various zones on its reflecting surface.

Briefly stated the invention relates to a method and apparatus for recording or visually observing the amount of spherical aberration present in a convex surface of revolution, said apparatus consisting of the following:

A light source that projects a collimated beam of light parallel to the optical axis of a specularly reflecting convex surface of revolution onto this convex surface which is mounted so it may be rotated about its optical axis. The light source or collimator may be moved to cover all zones of the convex surface.

The beam projected onto the convex surface is reflected onto a reflecting surface, this reflecting surface being vertically placed and perpendicular to the tangent line projecting radially from the point on the crown of the convex surface, where the optical axis pierces the said convex surface. This vertical reflecting surface is so adjusted that the reflected beam will strike this reflecting surface somewhere along a horizontal line in the plane of the reflecting surface, said line passing through the point of intersection of the tangent line projecting from the crown of the convex surface where the optical axis pierces said convex surface and the plane of the reflecting surface.

The light beam will then be reflected from the vertical reflecting surface so that it passes through the optical axis at or near the focal point of the convex surface. The point of intersection of the light beam with the optical axis or that point of the beam adjacent to the optical axis may be rendered visible on a ground glass plate set perpendicularly to the optical axis or be recorded by a photographic plate or other device replacing the ground glass.

Thus the focal test of a convex surface of a reflector mold is obtained by projecting a beam of light, parallel to the optical axis, upon said mold surface and reflecting said beam from the surface upon a mirror whose plane is perpendicular to a tangent passing through the axis. The beam when reflected by said mirror will pass through the focal point of the mold if the curvature of said mold is an accurately formed paraboloid of revolution, otherwise it will be spaced from the focal point. To determine the point of intersection of the beam with the axis, a photographic plate is arranged with its surface normal to the axis at the focal point as mentioned above.

In order to more fully understand the method and apparatus used to observe irregularities in the curvature of the mold, reference will be had to the diagrammatic illustration presented by Fig. 1, which shows a light ray $r_1$, from the collimator $C_1$ at position 1 parallel to the optical axis $ff'$, of the paraboloid of revolution representing the mold M.

Upon striking the convex surface of the mold, the ray is reflected along a line which emanates from the virtual focus $f$ of the mold M. If a plane mirror $m_1$ be placed with its reflecting plane in a truly vertical position somewhere along the line H—H', tangent to the paraboloid of revolution or mold surface M at its intersection $a$ with the central axis $f$—$f'$, then the ray $r_1$ from the collimator $C_1$ will again be reflected so that it will pass through point $f'$.

Upon examining the triangle $afm_1$, and triangle $af'm_1$, we see that they are congruent since angle $fm_1a$ equals angle $f'm_1a$ (law of reflection); right angle $fam_1$,=right angle $f'am_1$; and $am_1$ is common to both triangles. This being true, $af=af'$; but $af$ is the focal length of the mold, therefore $af'$ is also the focal length of the mold M. By the same reasoning, if a ray suffers aberration (see path of ray $r_2$, position 2), it emanates from a virtual focal point $\phi$ which differs slightly from the established focal point $f$, and will be reflected through $\phi'$ which is exactly the same distance from "$a$" as $\phi$. This shows that the amount of aberration is reflected exactly; so that the photographic plate P passed through $f'$ will record the aberration of the convex surface of the mold in exactly the same manner as it would for the concave mirror. It is important to repeat that the reflection of the mirror $m_1$ must take place on line H—H'. Should it take place on any other line parallel to H—H', similar triangles are obtained but not congruent ones and $af$ does not equal $af'$.

The apparatus designed to indicate irregularities in the curvature of molds is designed to operate as outlined in the diagrammatic drawing Fig. 1.

In this apparatus, shown assembled in Fig. 2, the mold is rotatably mounted on a turntable 10 beneath a longitudinal beam or bar 11 supported on uprights 12 and 12' constituting a supporting frame. The beam 11 supports a longitudinally and vertically slidable and universally mounted photographic plate holder 13 by a support 14, and a longitudinally movable collimator 15 and a track 16. On the track 16 is mounted a car 17 supporting mirrors $m$ and $m'$ so that they may be moved along a horizontal line tangent to the mold at its center line. A vertical beam of light from the collimator 15 to any desired point on the mold M may be reflected from the mold to one of the mirrors $m$ or $m'$, and from the mirror to the photographic plate 18 in plate holder 13.

The photographic plate holder support 14 comprises a base plate 19 attached to the beam 11 by means of bracket members 20 which may be clamped in any location along the beam by thumb screws 21. From the bottom of the base plate 19 extend angularly shaped support members 22 which support a disc 23, and from the disc 23 project standards 24 which pivotally support the plate holder 13, provided with a ground glass cover plate 25. The plate holder 13 may be retained at any angularity by means of the thumb screws 26. The collimator 15 comprises a tubular casing 27, a base plate 28, a bracket 29, a thumb screw 30 adapted to retain the collimator in any position along the beam 11, an electrical source of illumination 31, a lens 32, and a shield 33 provided with a slit 34. The beam 11 also supports the track 16 on which is mounted a car for longitudinal movement of mirrors $m$ and $m'$ as will be further explained.

To keep the mirrors $m$ and $m'$ in a truly vertical position, the following technique is used: A raft or float 40 is floated in a pool of mercury 41 in container 35. Since the mercury seeks its own level regardless of how the container is tilted, the floating raft 40, in turn, will also be independent of the tilt of the containing vessel. Oil or any other fluid may be used, but mercury provides the best damping against the oscillations of the raft. If a mirror $m$ is fixed rigidly to the raft in a truly vertical position when the raft is afloat, the mirror will always be in a truly vertical position whenever it is again set afloat.

In Fig. 3, it can be easily seen how the mirror supports 42, 42' and 43, 43' are attached rigidly to the raft. It will be noticed that a mirror is attached to each end of the raft, as designated by $m$ and $m'$. The extra mirror $m'$ in a plane parallel to the first one facilitates an important step in the examination of the mold. The important step (a step familiar to one operating a concave mirror focal test) is that part of the test where a point on the mold is checked for identical aberration characteristics on opposite sides of the optical axis. This insures the accurate line up of the apparatus with the optical axis of the mold. To do this with one mirror would mean turning the raft through 180° several times. To obviate this cumbersome step while the test is in progress, two mirrors $m$ and $m'$, as shown in Figs. 2, 3 and 5 are used. The mirrors $m$ and $m'$ are mounted on rectangular frames 44 and 44' and attached thereto by clamping members 45, 46, 47 and 45', 46', 47'. The mirror frames are provided with adjusting arms 48 and 48', and are pivotally mounted respectively between support members 42, 42' and 43, 43'. U-shaped adjusting members 49 and 49' are attached respectively to arms 42 and 43' by means of screws 50 and 50'. These U-shaped members are provided with adjusting screws 51, 52 and 51', 52' for adjusting the angularity of the mirrors $m$ and $m'$. While the raft 40 is afloat, the adjusting screws 51, 52 and 51', 52' are set so that the mirrors are in a truly vertical position. It will be noted that the adjustments are made at the end of the long lever arms 48 and 48' so as to permit delicate setting of the mirrors.

When the raft is floating in the container 35, as shown in Figs. 2 and 5, it is obvious that its freedom of motion must be limited to its freedom to right itself to a level so that the mirrors $m$ and $m'$ will assume a vertical position. Any extraneous motion would nullify the accuracy of the test. Figs. 4, 5 and 6, show the guides 53 and 53' mounted on the pivots 54 and 54', and the slots in the raft 40 that the guides slip into. The guides rotate freely in the bearings 55 and 55' mounted in the container 35 so that when the slots 59 and 59' on the raft or float 40 are slipped over the guides, the raft cannot float indiscriminately, but is free to rock only on an axis passing through the pivots and on an axis perpendicular to and passing through the axis of the pivots. With this freedom to rock, the raft will always come to rest freely in a level position. The container 35 which is rectangular in shape is supported by elliptical springs 62 and 62' which are mounted upon a rotatable base member 63. The base 63 is preferably formed of metal with turned up forward and rear ends 64 and 64'. The member 63 is mounted upon an axle plate 65 which is provided with downwardly projecting axle support members 60, 61 and 60', 61' on either side thereof, which are drilled centrally and bent down at 90° to the base to form bearings for the reception of the axles 66 and 66' on which are mounted track rollers 67, 67' and 68, 68'. The container 35, the rotatable base 63, and the axle plate 65 are drilled centrally at 69, 70 and 71, respectively, for the reception of a bolt 72 which is provided with a disc shaped head 73 at one end and a thumb screw 74 at the other. By tightening or loosening the thumb screw 74 against the action of the springs 62 and 62' resistance to angular movement of the container 35 with respect to the chassis of the vehicle may be increased or decreased.

On one end of the axle plate 65 a bracket 75 is pivotally connected by bolt 56. The bracket is drilled and tapped to receive a screw 76. One end of the screw 76 is provided with an annular groove adapted to engage an opening 78 in the turned up edge 64 of the plate 63. To the other end of the screw a knob 79 is rigidly attached to permit angular adjustment of plate 63 and with it the container 35.

Since the photographic plate holder 13 shown in Fig. 2, intersects the optical axis, the reflected image must be made to do the same. This can be done by manipulating the adjusting knob 79, shown in Fig. 4, so that the adjusting plate 63 moves the container 35 and raft 40 about the vertically positioned bolt 72 which passes through the center of the plate 65. The image reflected from the mirror $m$ can now be centered on the ground glass 25 in the photographic plate holder 13 by merely turning the adjusting knob 79 in the proper direction, until the image appears on the ground glass.

To permit easy movement of the mirror from one position to another, the chassis is mounted on wheels or rollers 67, 67', 68, 68', which ride on the track 16, as shown in Fig. 2. The track may be leveled by adjusting screws 80, 80', 81, 81', which regulate the elevation of the supporting arms 82, 82', 83, 83' so that the car may be moved in a truly horizontal path.

To obtain a good first surface reflector, a small plane glass is silvered and a very thin layer of colorless lacquer is put over it to prevent deterioration of the silver.

The method used to make certain that the image is reflected from the correct position on the plane mirror while operating in the dark is based on the change of quality of light when reflected from a true reflecting surface and a diffuse reflecting surface.

If a strip of cloth 85 provided with a central section 86 cut away to the center of its width, be pasted across the center of the mirror as shown in Fig. 8, the operator, working in the dark, will see a sharp bright beam reflected from the mirror itself. If the chassis is moved on the track 16 so that the image starts to creep up or creep down, it will soon strike the cloth. The quality of light from the image is now changed from a bright one to a diffuse one. This will be quite apparent to the operator. The object is to place the image in a position where it just grazes the cloth. (See position of image in Fig. 9.) Should the image creep up only slightly on the cloth as shown in Fig. 10, it will be detected because the quality of the light of the part of the image reflected from the cloth will differ widely from the sharp bright portion of the image produced by the reflecting surface.

To make certain that the image on the mirror "$m$" will lie in a plane tangent to the mold at the point where the optical axis pierces the surface of the mold, the following arrangement is used.

Wire extensions 87 and 87' (see Fig. 11) are projected on each side of the plane mirrors $m$ and $m'$ in such a manner that an imaginary extension of the image in its correct position (adjacent to the indicating cloth) will coincide with the wires.

To a supporting arm 88, shown in Fig. 3, a wire 89 tipped with a "cat's whisker" 90 is attached in a vertical position. This wire can be raised or lowered by the adjusting spring 91. While the raft is afloat and the mirror set in a vertical position, the "cat's whisker" is set so that the point lies in the same horizontal plane as the wire extension in Fig. 11.

With the track in a horizontal position, the "cat's whisker" 90 is set directly over the crown of the negative mold and lowered by the adjusting thumb screw 74, shown in Figs. 2, 4 and 5, until it just makes contact with the mold. At this point in the procedure, the crown of the mold and the point where the image should fall on the plane mirror $m$ or $m'$ are in the same horizontal plane. We know now that when the operator moves the chassis so that the image falls as shown in Fig. 11, the true picture of the aberration of the mold at that point is obtainable since the theoretical requirements are now met.

The track with chassis is hung absolutely horizontal from supports and is placed between the mold and the photographic plate holder. If we again examine Fig. 2, we see that the negative mold M rests on turntable 10. The tracks are placed horizontally between mold M and the plate holder 13 in such a manner that the end of the "cat's whisker" is roughly on line H—H'. The mold is then carefully centered and leveled in exactly the same manner as a concave mirror up to the point of preparation for the photograph of the aberration characteristics. In testing a concave mirror the operator takes eight equally spaced pictures in each zone without any further qualifications, whereas in testing a negative mold, the operator must first remember to set the "cat's whisker" 90 directly over the crown of the mold and lower it by the adjusting screw 74, as shown in Figs. 2, 5 and 6, until it just makes contact with the mold.

The operator should then assure himself that reflection of the image from the plane mirror $m$ or $m'$ takes place on the horizontal line, HH', Fig. 1, tangent to the crown of the mold. Since the aberration in any particular zone is usually unsymmetrical, it is of utmost importance to adjust the plane mirror after each one of the eight pictures of the zone to make certain that the reflection takes place from the indicated position. Fig. 12 represents positions 1, 2 and 3 of the plane mirror normal to the line HH'. Reflected rays 1', 2' and 3' are possible from positions 1, 2 and 3 of the plane mirror. The only reflected ray that is correct is 2' which is reflected from the mirror in position 2, because the reflection takes place on line HH'.

Figure 15:
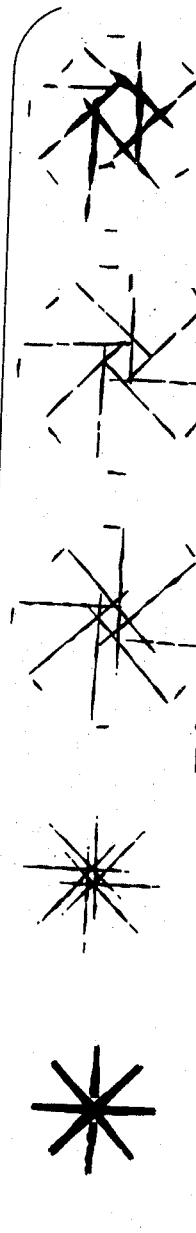
Fig. 15 is a similar view to Fig. 13 for a metal negative mold.
Figure 16:
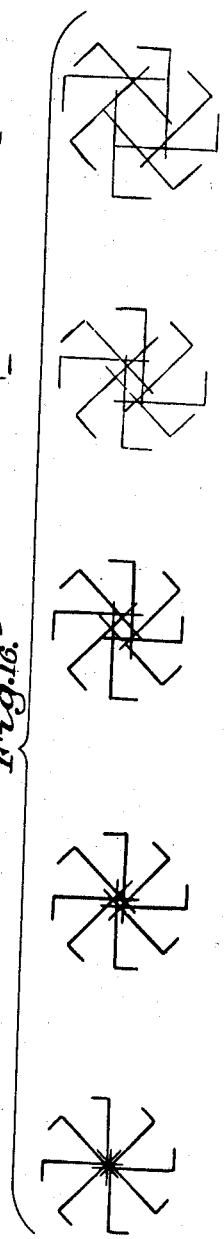
Fig. 16 is a similar view to Fig. 13 for a metal mirror.

The results of a test showing focal characteristics of a convex surface or negative mold in various zones is illustrated in Fig. 15. These focal characteristics are similar in every detail to those of a concave mirror and are interpreted in exactly the same manner.

Figure 14:
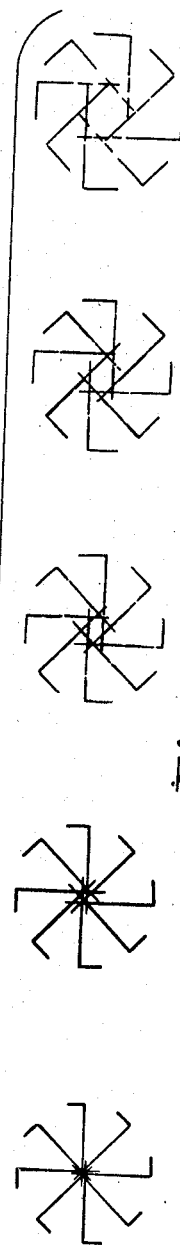
Fig. 14 is a similar view to Fig. 13 for a metal positive mold.

Four focal tests are represented in Figs. 13, 14, 15 and 16. In these tests Fig. 13 shows the aberration characteristics of a 60-inch parabolic glass form, silvered on the back or convex surface; Fig. 14 shows a metal positive mold, Fig. 15 a metal negative mirror. The 60-inch parabolic glass form produced the metal positive mold which latter, in turn, produced the negative metal mold. The metal mirror was then produced from the negative metal mold.

There is a definite similarity in the focal tests of the positive mold, negative mold and the mirror, but the focal test of the glass differs considerably due to the refraction in the glass.

The convex surface of the glass is used to make a positive mold. The aberration of the surface is determined by a focal test through the concave surface of the glass to the silvered convex surface. A fraction of the beam of light from the collimator is reflected from the concave side, but most of it is reflected from the silvered convex surface of the glass. However, the light beam suffers a refraction when it passes from the air into the glass and then out again after reflection from the back or silvered surface. This results in the wide focal test as shown in Fig. 13.

The portions of the beam which are reflected directly from the front surface of the glass and by extra internal reflections between the front and back surface of the glass, show up as very light images or "ghosts." In order to obtain a correct picture of the focal characteristics of a glass, it is necessary to perform the focal test directly from the convex surface.

In these tests the eccentricity of the images indicates the degree of departure of the surface of the mold or mirror from the true curvature of a paraboloid of revolution as it shows that the ray from the collimator intersects the central axis of the mold at a point removed from the focus $f'$. The amount of eccentricity of the images indicates the degree of aberration which would result if the surface of the mold or mirror were not corrected.

Having thus described our invention, what we claim as new and wish to secure by Letters Patent is:

1. An apparatus for testing the curvature of the convex surface of a mold having the contour of a paraboloid of revolution and adapted to reflect a light beam, said apparatus comprising means for mounting said mold for rotation about its central axis, means radially movable to and from said central axis for projecting said beam parallel to said axis so as to scan predetermined zones on the reflecting convex surface, means including a mirror radially movable to and from said axis along a tangent to said convex surface at its central axis, said means being adapted to reflect the reflected beam from said convex surface toward the focal point thereof, and a holder for supporting a photographically sensitized plate perpendicular to said axis at said focal point to record the proximity of the reflected beam to said focal point and thereby indicate the degree of accuracy of the curvature of said mold.

2. An apparatus for testing the curvature of convex surfaces of revolution comprising a turntable for rotatably mounting said surface, a rail supported horizontally above the center of said turntable, a collimator adapted to project a light beam around said convex surface, a photographic plate for receiving light from the convex surface, a plate holder for the photographic plate, means for adjustably mounting the collimator and the plate holder on said rail, a track suspended from said rail and adapted to be arranged in a horizontal plane above and across the center of said turntable, a movable car mounted on said track, a mercury container mounted on said car, a raft floated in mercury within said container, and mirrors suspended from the raft adapted selectively to reflect a beam of light projected from the collimator and reflected from the convex surface when the collimator is positioned on the bar relatively to the mirrors for reflecting a beam of light to the mirror corresponding to the position of the collimator relative to the center line of the turntable, the photographic plate being positioned relatively to the mirrors for receiving light reflected from the selected mirror by the beam from the collimator for indicating changes of curvature of the convex surface being tested.

3. An apparatus for testing the curvature of convex surfaces of revolution comprising a turntable for mounting said surface and for rotation of the same about its central axis, a rail supported above the center of said turntable, a collimator adjustably mounted on said rail and adapted to project a light beam upon said rotating convex surface, a photographic plate holder adjustably connected to said rail, a photographic plate in the holder adapted to receive said beam after reflection from said surface, a track suspended from said rail, and means for adjusting said track into a horizontal plane, a car mounted for movement along said track, a mercury container mounted on said car, a raft floated in said mercury container, and a mirror suspended from said raft adapted to reflect a beam from said collimator, after reflection from said convex surface, to said photographic plate to indicate variations in the curvature of said convex surface.

4. An apparatus for testing the curvature of convex surfaces of revolution comprising a turntable for mounting said surface and for the rotation of the same about its central axis, a rail supported by vertical standards, said rail extending horizontally above the center of said turntable, a collimator adjustably mounted on said rail and adapted to project a light beam upon said convex surfaces, a photographic plate adapted to receive said beam after reflection from said convex surfaces, and a plate holder for the photographic plate adjustably connected to said rail for longitudinal movement thereon, a track suspended from said rail, means on the track for adjusting the plate and plate holder in a horizontal plane, a car mounted for movement along said track, a mercury container mounted on said car, a raft floated within said mercury container, and a mirror suspended from said float adapted to reflect a beam from said collimator, after reflection from said convex surfaces, to said photographic plate to indicate changes in the curvature of said convex surfaces.

5. A method for testing the curvature of a convex surface of revolution comprising coating said surface with a reflecting material, projecting a beam of light parallel to the axis of revolution of said surface, reflecting said beam from said convex surface upon a mirror perpendicular to a tangent through the point of intersection of the said axis with the convex surface, and intercepting the beam when reflected from said mirror by a photographically sensitized plate, perpendicular to the axis at the focal point of said convex surface, to obtain an image thereon by proximity of which to the focal point designates the degree of accuracy of curvature at the point of reflection from said convex surface, and determining a plurality of said points for various zones on the convex surface by projecting said beam parallel to the axis at various distances therefrom and for various degrees of rotation of the convex surface about said axis.

6. An apparatus for testing the curvature of the convex surface of a mold having the contour of a paraboloid of revolution and adapted to reflect a light beam, said apparatus comprising a turntable for mounting said mold for rotation about its central axis; a collimator radially movable to and from said central axis for projecting said beam parallel to said axis so as to scan predetermined zones on the reflecting convex surface, a car having a mirror connected therewith, said car being radially movable to and from said axis so that said mirror is moved along a tangent to said convex surface at its central axis, said mirror being adapted to reflect the reflected beam from said convex surface toward the focus thereof, and means for supporting a photographically sensitized plate perpendicular to said axis at the focus to record the proximity of the reflected beam thereto to said focus and thereby indicate the degree of accuracy of the curvature of said mold at points tested.

7. An apparatus for testing the curvature of the convex surface of a mold having the contour of a paraboloid of revolution, and provided with a reflecting surface adapted to reflect a light beam, said apparatus comprising a turntable for mounting said mold for rotation about its central axis, a frame having a horizontal bar supported above the center of said turntable, a track adjustably supported from said bar, a collimator slidably mounted on said bar and radially movable to and from said central axis for projecting said beam parallel to said axis so as to scan predetermined zones on the reflecting convex surface with a rotary movement of the mold, a car having a mirror mounted thereon, said car being radially movable on said track to and from the axis so that the mirror is moved along a tangent to said convex surface at its central axis, said mirror being adapted to reflect the reflected beam from said convex surface toward the focus thereof, and means slidably mounted on said horizontal bar for adjustably supporting a photographically sensitized plate perpendicular to said axis at the focus, said plate being adapted to record the proximity of the reflected beam to said focus and thereby indicate the degree of accuracy of the curvature of said mold.

8. A method for testing the curvature of a convex surface comprising coating said surface with a reflecting material, projecting a light beam upon said surface parallel to the axis of revolution thereof, intercepting the beam after reflection from said convex surface by a plane reflecting surface located perpendicular to a tangent to said surface at the point of intersection thereof with with said axis to reflect said beam toward the focal point of said convex surface, and intercepting the beam after reflection from said plane reflecting surface by a photographically sensitized plate located perpendicular to said axis at said focal point to indicate the proximity of said beam to said focal point and thereby determine the degree of accuracy of curvature of said surface at the point tested.

9. A method for testing the curvature of the convex surface of a paraboloid of revolution comprising coating said surface with a reflecting material and mounting the same for rotation about its principal axis, projecting a beam of light from a radially movable light source upon said surface parallel to said principal axis and reflecting said beam upon a flat reflecting surface perpendicular to and radially movable along a tangent to the vertex of said convex surface, reflecting said reflected beam by said flat reflecting surface toward the focal point of said convex surface, and intercepting said beam after reflection from said flat surface by a photographically sensitized plate located perpendicular to said principal axis at said focal point to indicate the proximity of said beam to said focal point to thereby determine the degree of accuracy of curvature of the surface at the point tested, and rotating said convex surface and changing the radial positions of said light source and flat mirror to obtain similar indications for various points on said surface and thereby determine the accuracy of its curvature.

10. An apparatus for testing the curvature of the convex surface of a mold having the contour of a paraboloid of revolution and adapted to reflect a light beam, said apparatus comprising a turntable for mounting said mold for rotation about its central axis, a frame including a horizontal bar above the center of said turntable, a plate holder support rotatable about an axis parallel to the central axis and a collimator each being longitudinally adjustable on said bar, said collimator being adapted to project a light beam on said mold parallel to said axis, a photographic plate holder mounted on said support for angular adjustment about an axis at right angles to the central axis, said plate holder being positioned at such a distance from the mold that the plate can be moved to a position at the focal point of said convex surface, a track supported from said bar, a car to roll on said track to either side of said axis, a mercury container mounted on said car, a raft adapted to float in a pool of mercury in said container, mirror supports mounted on the ends of said raft, oppositely facing mirrors connected to said mirror supports, adjusting means in connection with said mirror supports adapted to position said mirrors in parallel vertical planes perpendicular to a tangent to the mold at its central axis, means in connection with the chassis of the car and the container for regulating the height of said mirrors, and means including a supporting arm and a cat's whisker supported by said mirror supports adapted to indicate the highest point on the mold for the adjustment of the mirrors to the same height, whereby the rotation of the turntable and the horizontal movement of said collimator on said bar and the movement of a mirror along said tangent can effect the interception of a surface reflected beam from said collimator at various distances from the axis and at various angles of rotation of the mold and the reflection of said beam upon said photographic plate to determine its proximity to the focal point and thereby define the degree of departure of the convex surface of the mold from its correct contour.

BENJAMIN GOLDBERG.
NELS C. BENSON.